United States Patent
Basavaiah et al.

(10) Patent No.: US 8,051,203 B2
(45) Date of Patent: Nov. 1, 2011

(54) PROVIDING SCSI ACCELERATION AS A SERVICE IN THE SAN

(75) Inventors: Murali Basavaiah, Sunnyvale, CA (US); Kiron Haltore, San Jose, CA (US); Anand Parthasarathy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 12/474,966

(22) Filed: May 29, 2009

(65) Prior Publication Data

US 2010/0232440 A1 Sep. 16, 2010

Related U.S. Application Data

(60) Provisional application No. 61/159,770, filed on Mar. 12, 2009.

(51) Int. Cl.
*G06F 15/16* (2006.01)

(52) U.S. Cl. .................................. 709/239; 709/225

(58) Field of Classification Search .................. 370/389, 370/401; 709/225, 239
See application file for complete search history.

(56) References Cited

U.S. PATENT DOCUMENTS

| | | | |
|---|---|---|---|
| 7,856,013 B2 * | 12/2010 | Brewer et al. ................. | 370/389 |
| 7,881,325 B2 * | 2/2011 | Cheethirala et al. .......... | 370/422 |
| 2005/0138184 A1 * | 6/2005 | Amir .............................. | 709/228 |
| 2008/0010290 A1 * | 1/2008 | Lecrone et al. ................. | 707/10 |
| 2008/0294846 A1 * | 11/2008 | Bali et al. ....................... | 711/118 |

* cited by examiner

*Primary Examiner* — Patrice Winder
(74) *Attorney, Agent, or Firm* — Patterson & Sheridan, LLP (57) ABSTRACT

Techniques are disclosed for abstracting write acceleration techniques and tape acceleration techniques away from transport providers (e.g., away from an FC or FCIP interlink between two storage area networks) and allowing acceleration to be provided as a service by nodes within the storage area network (SAN). Doing so allows the acceleration service to be provided anywhere in the SAN. Further, doing so allows users to scale the acceleration service as needed, without having to create awkward topologies of multiple VSANS. Further still, as the acceleration service is offered independently from the transport, compression, encryption, and other services may be offered as part of the transport between the FC/FCIP connection along with the acceleration service.

17 Claims, 6 Drawing Sheets

PROVIDING SCSI ACCELERATION AS A SERVICE IN THE SAN

CROSS-REFERENCE TO RELATED APPLICATION

This application claims benefit of U.S. Provisional Patent Application Ser. No. 61/159,770 filed Mar. 12, 2009, which is incorporated herein by reference.

BACKGROUND

1. Technical Field

Embodiments described in this disclosure generally relate to storage area networks (SAN). More particularly, the described embodiments relate to methods and apparatus for providing SCSI acceleration as a service in a SAN.

2. Description of the Related Art

Modern data centers are built around storage area networks used to provide secure, reliable, and scalable centralized data-storage facilities. A storage area network (SAN) provides a high-speed special-purpose network that interconnects different data storage devices and associated data hosts on behalf of a larger network of users. Generally, a SAN is used to attach computer storage devices, e.g., disk arrays, tape libraries and optical jukeboxes, to a host. The SAN operates such that the storage devices appear to each host as being locally attached, i.e., as though the storage devices where physically connected to the host.

Fiber Channel (FC) or Fibre Channel over IP (FCIP) is typically used to interconnect multiple data centers, e.g., to consolidate storage and physical tape libraries for disaster recovery. Typically, FC is used to interconnect the datacenters and FCIP is used to interconnect the SAN islands across the WAN using the IP cloud. Frequently, applications run across these environments provide remote replication of storage arrays and tape backups to vault the tapes in a common location. The latency introduced by MAN and WAN links and the requirements of the SCSI I/Os (especially for sequential devices such as tapes) significantly affect the performance of such applications. Accordingly, some acceleration techniques have implemented at the end points of the two sites over the MAN or WAN. As the SCSI I/Os are bidirectional in nature; however, these techniques require the traffic flows to traverse the same end points in both the directions. In the case of SCSI write acceleration, e.g., a given I/O must traverse the same end points. Similarly, in the case of tape acceleration, the entire traffic flow must traverse the same end points as this technique operators over multiple I/Os. These requirements have resulted in awkward network topologies to force certain traffic flows over the endpoint nodes connecting two SANS in order for these acceleration techniques to function.

SUMMARY

Embodiments described in this disclosure provide techniques for providing SCSI acceleration as a service in a storage area network. One embodiment includes a system. The system may include a first routing device in a first storage area network (SAN). The routing device may include a processor and a memory. The memory may itself include a program configured to perform an operation for providing an acceleration service for a write operation initiated between an initiating device attached to the first SAN and a target device attached to a second SAN. Generally, the first SAN and the second SAN are connected via a network link, such as a Fibre Channel (FC) or a Fibre Channel over IP connection. The operation performed by the first routing device may generally include receiving a write operation sent from the initiating device attached to the first SAN, where the write operation has been redirected to the first routing device based on an entry in a redirect table shared among a plurality of routing devices in the first SAN. The operation performed by the first routing device also includes performing the acceleration service to transfer data between the initiating device and the target device in order to complete the write operation. The acceleration service is performed in conjunction with a second routing device on the second SAN.

In a particular embodiment, the acceleration service is a SCSI acceleration service and the write operation is a SCSI write operation. Alternatively, the acceleration service may be a tape acceleration service, in cases where the target device is a tape library. The redirect table may provide a network address translation (NAT) access control list (ACL), specifying a plurality of source/destination address pairs to redirect to a respective redirected source/destination address pair.

Another embodiment includes a computer-readable storage medium, containing a program, which, when executed on a first routing device in a storage area network (SAN) performs an operation. The operation may generally include receiving a write operation sent from an initiating device attached to the first SAN to a target device attached to a second SAN. The write operation is redirected to the first routing device based on an entry in a redirect table shared among a plurality of routing devices in the first SAN. Also, the first SAN and the second SAN are connected via a network link. The operation may also include performing an acceleration service to transfer data between the initiating device and the target device in order to complete the write operation. The acceleration service is performed by the first routing device in conjunction with the second routing device on the second SAN.

Still another embodiment includes a method. The method may generally include receiving, at a first routing device in a storage area network (SAN), a write operation sent from an initiating device attached to the first SAN to a target device attached to a second SAN. The write operation has been redirected to the first routing device based on an entry in a redirect table shared among a plurality of routing devices in the first SAN and the first SAN and the second SAN are connected via a network link. The method may further include performing an acceleration service to transfer data between the initiating device and the target device in order to complete the write operation. The acceleration service is performed by the first routing device in conjunction with the second routing device on the second SAN.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments described herein disclosure techniques for providing SCSI acceleration as a service in a storage area network (SAN). As described herein, the acceleration service may be used to abstract Fibre Channel (FC)/Fibre Channel over IP (FCIP) write acceleration techniques (as well as tape acceleration techniques) outside of the FC/FCIP end points. Doing so allows the acceleration service to be provided anywhere in the SAN. By abstracting the FC/FCIP write acceleration and tape acceleration techniques away from the transport itself (i.e., away from the FC or FCIP end points), the write acceleration service may be provided using a pair of service nodes, one in each site. Further, as the acceleration service is offered independently from transport, services such as compression, encryption, etc., may be offered as part of the transport between the FC/FCIP connection, along with the acceleration service. Further still, these other services may be offered independently (or co-located) on the application nodes. For example, data compression or encryption services may be integrated with the acceleration service.

In one embodiment, a Fibre Channel redirect infrastructure is used to route the appropriate flows through the application nodes which provide the write acceleration service at each data center. For example, NAT ACL entries may be used to manipulate source/destination pairs included in frames traversing the SAN to route the frames to the acceleration service endpoints, and to/from the eventual source and destination. However, switches that interconnect the sites across the MAN/WAN may either be FC or FCIP and can have multiple paths (e.g., port-channel or equal cost routes). This allows the user to provide the acceleration service seamlessly without having to craft specific topologies using virtual SANS (VSANs) and also allows multiple paths traversing the WAN/MAN to be deployed, providing both redundancy and capacity. In one embodiment, the FC-redirect infrastructure ensures that traffic reaches the destination (target) addressed as though the traffic was coming from the original source (the initiator), thus, the acceleration service operates transparently to the initiator and target. Further, no manual configuration, or importantly, network rewiring, is required for the acceleration service application to be provided by the FC-redirect infrastructure.

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s).

Additionally, the application programs disclosed herein may be distributed on a variety of computer-readable storage media. Illustrative computer-readable storage media includes, but is not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. For example, as described in greater detail herein, one embodiment includes a computer-readable storage medium containing a program, which when executed on a processor is configured to perform an operation on a routing device in a SAN.

Figure 1:
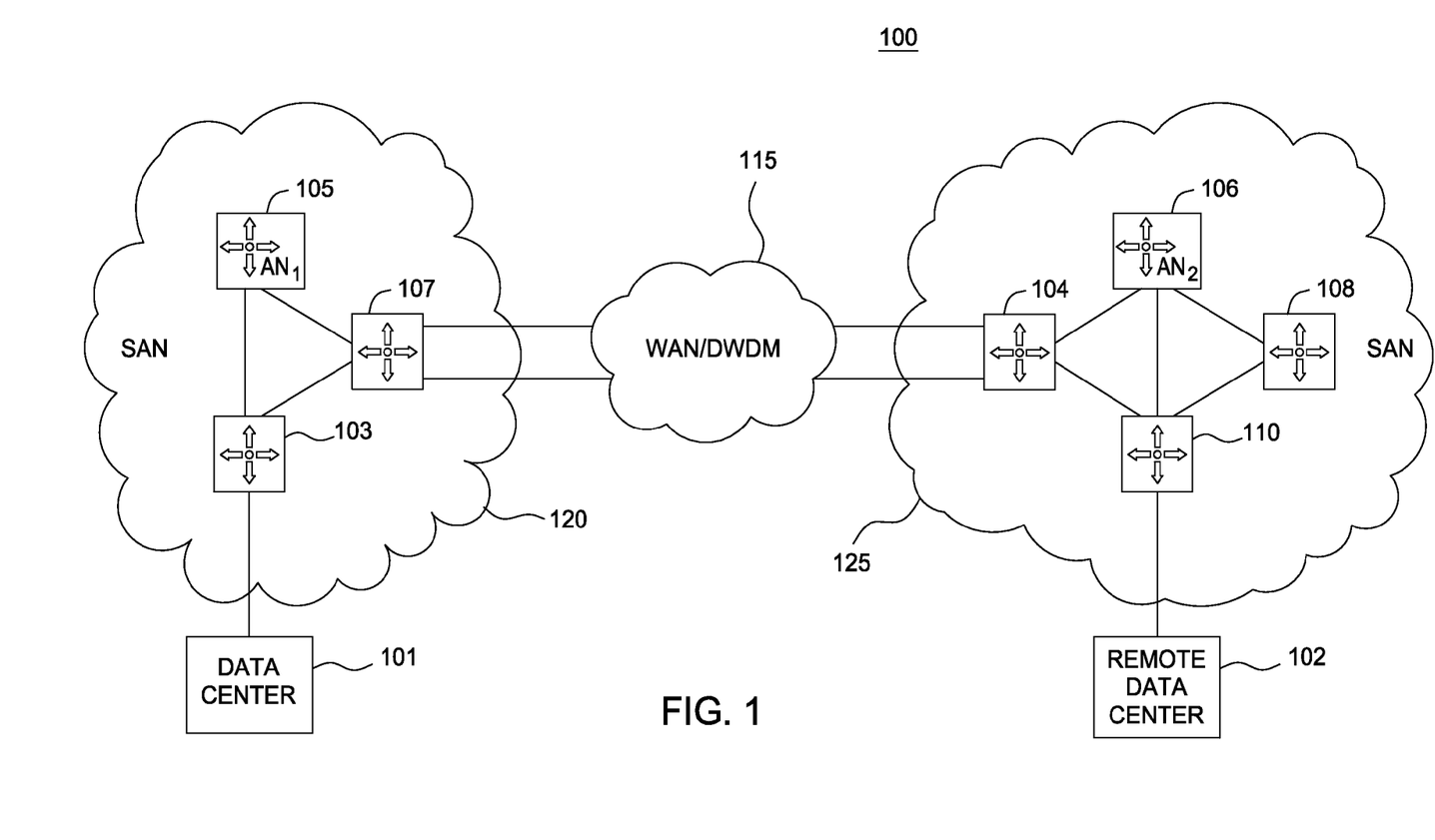
FIG. 1 is a block diagram illustrating an example network topology that includes of a first and a second data center, each connected to a storage area network (SAN), according to one embodiment.

FIG. 1 is a block diagram illustrating an example network topology 100 that includes of a data center 101 and a remote data center 102, each connected to a storage area network (SAN) 120, 125, according to one embodiment. In this example, the data center 101 and data center 102 may be used to connect a host device to a storage device, e.g., to connect systems at data center 101 to disk arrays, tape libraries, etc., at remote data center 102. As shown, the SAN 120 includes switches 103, 105, and 107 and SAN 125 includes switches 104, 106, 108, and 110. Additionally, switch 107 in SAN 120 and switch 104 are connected to WAN/DWDM network 115. Thus, traffic may flow between SAN 120 to SAN 125 over switches 104 and 107. The network 115 may be a FC connection (typically used over a MAN) or a FCIP connection (typically used over a WAN).

In one embodiment, the hosts, storage devices, and switches of the SAN 120 and 125 may be configured to communicate according to the publicly available Fibre Channel protocol. As is known, the Fibre Channel protocol addresses a general need in networking for very fast transfers of large amounts of information. Fibre Channel networks utilize an arrangement of switches (e.g., switches 103-110), called a fabric, to connect devices (e.g., systems at data center 101 and remote data center 102). This approach simplifies the overhead associated with network traffic, as a device with a Fibre Channel port need only manage a point-to-point connection between its port and the Fabric. Further, SANs may be connected to one another using FC interlink switches or FCIP connections, or combinations of both (illustrated in FIG. 1 as the connection to WAN/DWDM network 115 by both switch 107 in SAN 120 and switch 104 in SAN 125).

In Fibre Channel (FC), each device (e.g., each host, storage device, and switch) is identified by a globally unique, eight (8) byte wide World Wide Name (WWN) assigned by the manufacturer. When the FC devices are interconnected to form a SAN or VSAN, the WWN (along with other parameters) is the primary mechanism to uniquely identify each device. Fibre Channel frames are used for communication among the devices in the SAN. The WWN, however, is not used by the frames. Instead, each device logs on to the FC fabric and is dynamically assigned a unique Fibre Channel address (FCID) by the fabric. The FCID is used in FC networks for end devices to communicate with each other. For example, a frame may include a source FCID and a destination FCID used to identity the source and destination of a given data frame.

Each switch 103-110 may include a processor and a memory adapted to route traffic between data center 101 and 102 (and internally within SAN 120 and 125). Further, at least one switch in each of SAN 120 and 125 may be configured to provide a write acceleration service as a pair of application nodes (as well as to perform a variety of intelligent services to data frames sent over the SAN 120 and 125). Illustratively, switch 105 in SAN 120 and switch 106 in SAN 125 are labeled $AN_1$ and $AN_2$, respectively, to indicate that these nodes are configured to provide write acceleration for I/O operations between systems at data center 101 and remote data center 102.

Of course, the configuration of SAN 120 and 125 shown in FIG. 1 represents a simple example of a SAN fabric in which techniques of described embodiments may be practiced. In more complex configurations, the fabric may include any number of Virtual SANs (VSANs) that themselves include any number and type of host and storage devices or virtual devices. Further, the fabric may also employ Inter-VSAN routing (IVR) to connect SAN 120 and 125, which allows routing between VSANs, and enables users to share resources across VSANs.

In general, systems at data center 101 may initiate I/O operations (e.g., a SCSI write operation) with a storage device physically provided by systems at the remote data center 102. For example, remote data center 102 may host tape back-up systems used to provide data redundancy for data stored at data center 101. Similarly, remote data center 102 may provide dynamic data replication for systems at data center 101. In such cases, when a system at data center 101 initiates a write operation (e.g., a SCSI write operation), the write operation is sent to a virtual storage device that appears to the system at data center 101 to be locally attached.

Such a write operation is forwarded to the SAN 120, routed over the WAN/DWDM network 115 to SAN 125, and ultimately to a physical storage device at remote data center 102. In turn, the storage device at remote data center 102 responds to the write operation started by the initiator at data center 101. For example, as is known, a SCSI write operation includes both a "request to send" and a "ready to send" message exchange between an initiator and a target. The sequence of messaging between the initiator and target generally follows the following sequence:

"Write" command sent from initiator
"ready-to-send" message sent by target
Data sent by initiator to target
"Status" message sent by target to initiator The "status" message completes the I/O sequence between the initiator and the target. As can be seen, when the SCSI write is performed in the network topology 100, the operation requires traversing the WAN/DWDM 115 twice—incurring twice the round trip time in latency for each write operation.

Further, the SCSI write operation specifies that the initiator needs to receive a "ready to send" message from the target, prior to transferring any data. Thus, in many instances, the message exchanges between data center 101 and 102 introduce substantial latency for each write operation performed between systems at data center 101 and remote data center 102. Further, this result is magnified when systems at data center 101 perform multiple I/O operations (e.g., serial writes to a tape backup at remote data center 102).

In one embodiment, a switch in SAN 120, in conjunction with a switch in SAN 25 may be configured to provide a write acceleration service (e.g., a SCSI write acceleration service or a tape acceleration service) to reduce the latency for I/O operations between data center 101 and remote data center 102. For example, a write operation initiated by systems at data center 101 may be redirected to the switch 105 ($AN_1$), which, in conjunction with switch 106 ($AN_2$) implements a write acceleration service for traffic flows between data centers 101, 102.

Any suitable mechanism may be used to redirect traffic between a particular initiator and storage device target to the switches providing the acceleration service (e.g., switch 105 ($AN_1$) and switch 106 ($AN_2$)). In one embodiment, the switches in SAN 120 and SAN 125 may each have access to with a Network address translation (NAT) access control list (ACL) (FC-redirect table) used to redirect traffic flowing from data center 101 to remote data center 102 to the switches 105 and 106, which provide the acceleration service. Each entry in the FC-redirect table specifies a binding between a particular input source/destination pair in an FC data frame and a redirected source/destination pair. The FC-redirect table may be used to redirect frames sent from the data center 101 to the first node in a pair of nodes providing the acceleration, in this example, to switch 105 ($AN_1$). For example, when the switch connecting data center 101 to SAN 120 (switch 103), receives traffic representing a write operation initiated by system at the data center 101, an ACL entry may be used to redirect the frame carrying the write operation to the switch 105. When the switch 105 receives the redirected frame, it implements the acceleration service for the data in the frame (in conjunction with switch 106 ($AN_2$) on SAN 125). Thus, once the frame is released from the switch 105, it is routed to switch 106 (AN2) in the remote data center 102. Further, an entry in the ACL list is used to redirect the frame to a target (T) at the remote data center 102 with a source/destination pair of (Initiator (I), Target (T)). Thus, the frame arrives at the remote data center as though being sent from the initiator at data center 101, mirroring what occurs in the absence of a write acceleration service or FC-redirect in SANs 120, 125. That is, the write acceleration service operates transparently to the system initiating the write operation (at data center 101) and the target receiving and performing the write operation (at remote data center 102).

Figure 2:
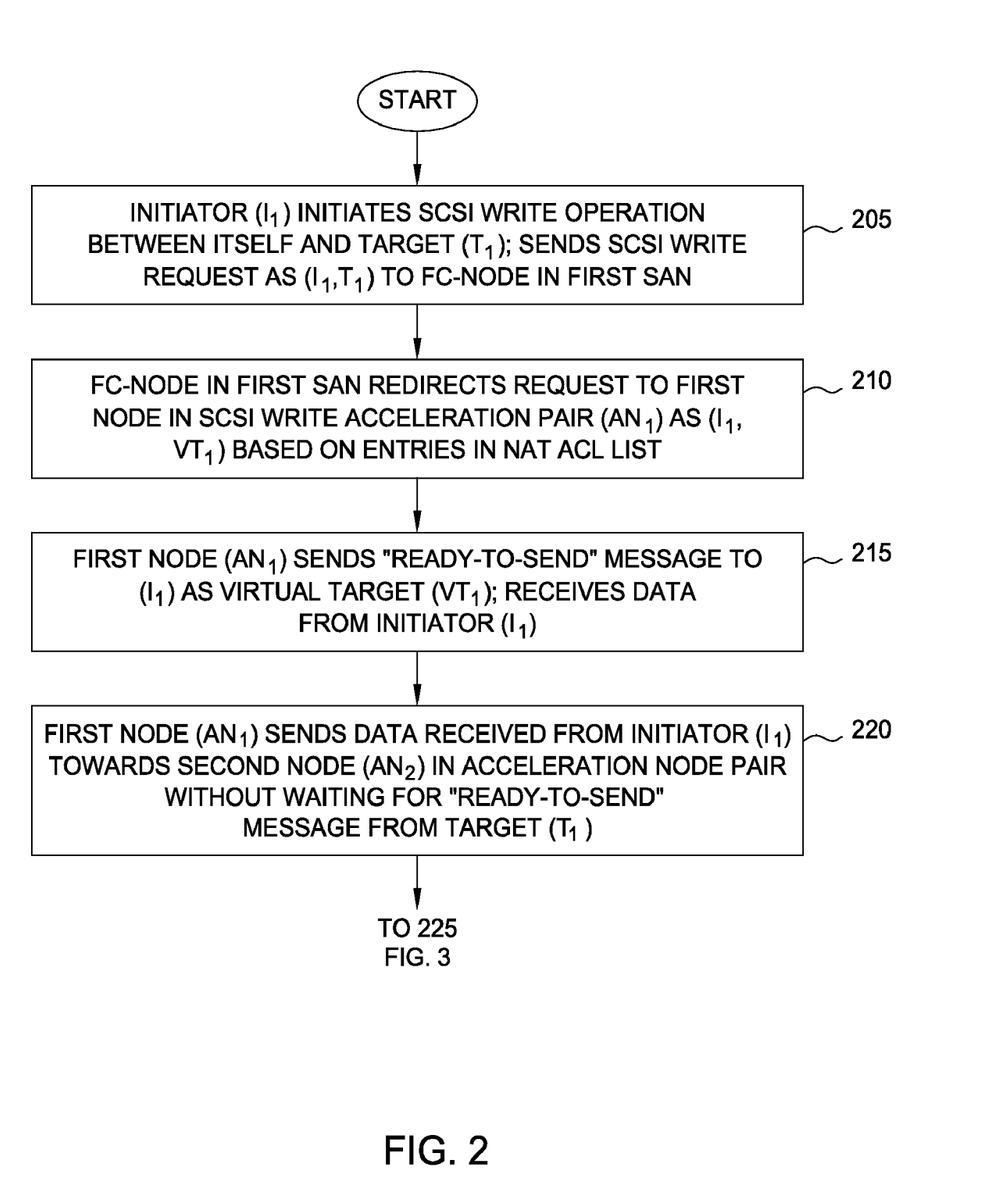
FIGS. 2-3 are a flow chart illustrating a method for providing SCSI acceleration as a service in a SAN, according to one embodiment.
Figure 3:
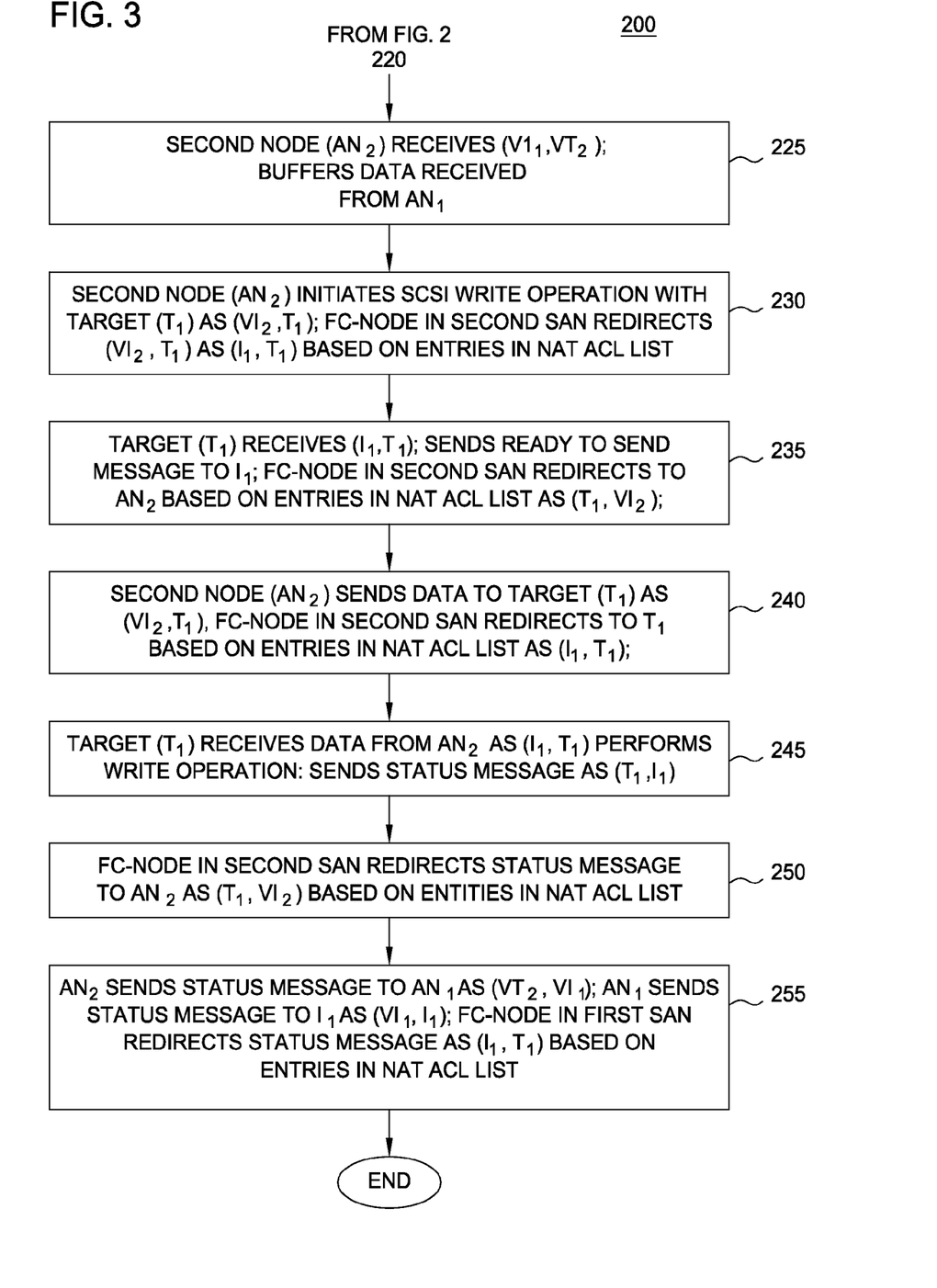

FIGS. 2 and 3 are a flow chart illustrating a method 200 for providing SCSI acceleration as a service in a SAN, according to one embodiment. Aspects of the method 200 are described in conjunction with FIGS. 4A-4B, which illustrate an example write acceleration service being provided for the network topology 100 first shown in FIG. 1.

Figure 4A:
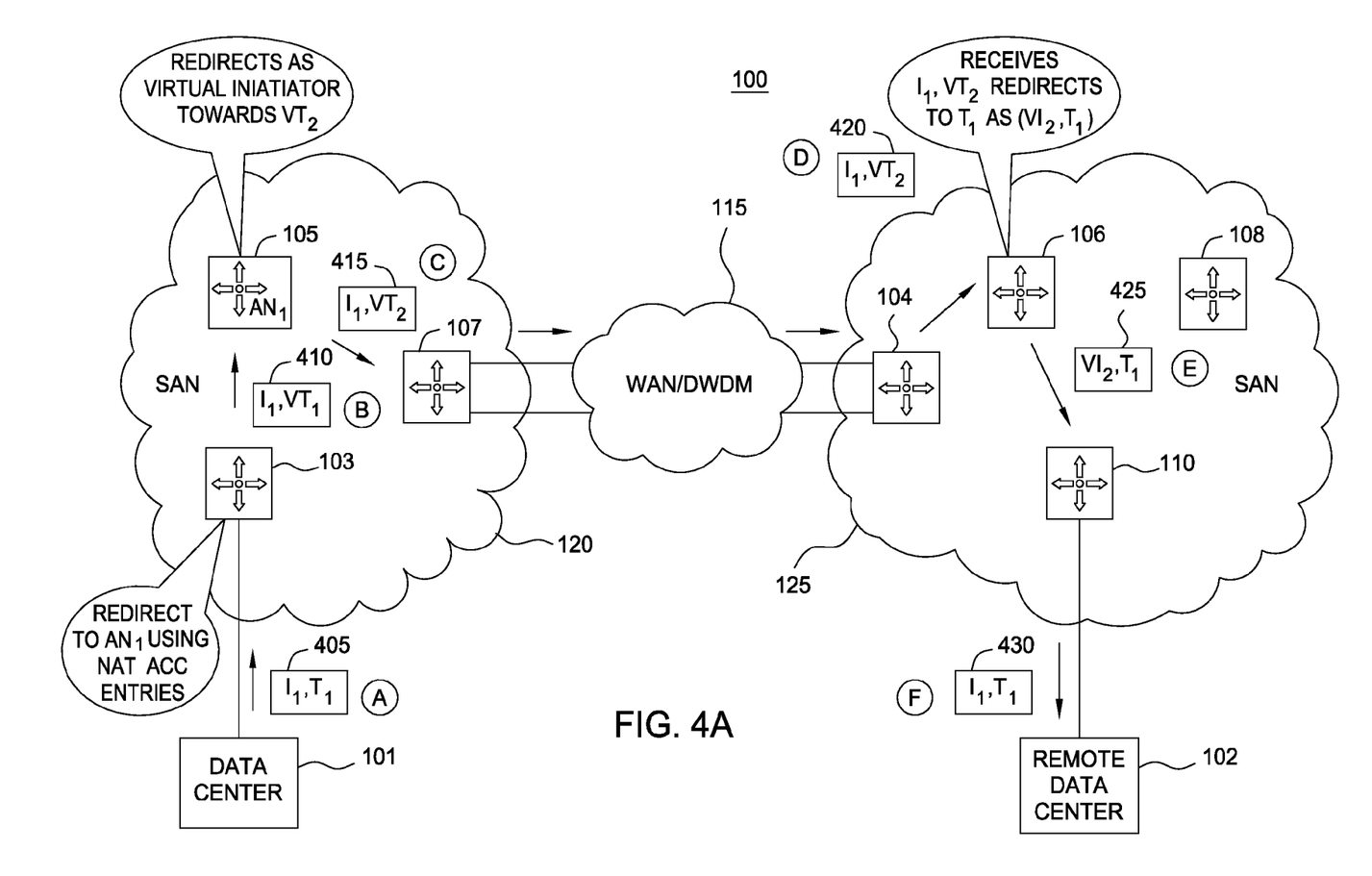
FIGS. 4A-4B illustrate an example of providing SCSI acceleration as a service in a SAN using the network topology first shown in FIG. 1, according to one embodiment.

As shown, the method 200 begins at step 205 where an initiator ($I_1$) in a first SAN initiates an I/O operation (e.g., a SCSI write operation) between itself and a target ($T_1$). For example, the initiator ($I_1$) may send a SCSI write operation with an FC source/destination pair of ($I_1$, $T_1$) to a node connecting the initiator system to a first SAN. This is illustrated in FIG. 4A at "A" where an FC-frame 405 with a source/destination pair of ($I_1$, $T_1$) is sent from data center 101 to switch 103 in SAN 120.

At step 210, the FC-node in the first SAN redirects the write operation to a node configured to provide the write acceleration service. As described above, an FC-redirect table may include an entry to redirect a write operation addressed as ($I_1$, $T_1$) to a virtual target ($VT_1$). In this example, the virtual target ($VT_1$) is the switch in the first SAN configured to provide the acceleration service for I/O operations between the initiator $I_1$ and the target $T_1$. The acceleration service is provided in conjunction with a switch in SAN 125. Thus, relative to data center 101, switch 105 ($AN_1$) acts as a virtual target ($VT_1$) for the write operation requested by initiator ($I_1$). FIG. 4A shows switch 103 redirecting FC-frame 405 to switch 105 ($AN_1$). That is, switch 103 redirects the FC frame to the node in SAN 120 providing the write acceleration service. This is illustrated in FIG. 4A at "B" where an FC-frame 410 is sent from switch 103 to switch 105 ($AN_1$) with a source/destination pair of ($I_1$, $VT_1$).

At step 215, the first node ($AN_1$) sends a "ready to send" message to the initiator ($I_1$) at data center 101 as being from virtual target ($VT_1$). In one embodiment, the "ready to send" message arrives at the initiator ($I_1$) addressed as being from the Target ($T_1$), i.e., as ($T_1$, $I_1$). In response, the initiator ($I_1$) sends the data relevant for the write operation, addressed as ($T_1$, $I_1$). Again, when received by switch 103, the frame is redirected to switch 105 ($AN_1$) (as $VT_1$) based on the original source/destination pair of ($I_1$, $T_1$) and the entry in the FC-redirect table for this source/destination pair. Once received, the switch 105 ($AN_1$) may store the data received from the initiator ($I_1$) in a buffer on switch 105 allocated for this purpose.

At step 220, the first node of the acceleration node pair sends data received from the initiator ($I_1$) towards with a second node of the service (as a virtual target ($VT_2$)). In one embodiment, the switch 105 ($AN_1$) does not wait for a "ready-to-send" message before sending data to the switch 106 ($AN_2$), shown in FIG. 4A as "C" and "D." Instead, the switch 105 ($AN_1$) sends the commands and data back-to-back. Note, in a particular embodiment, the switch 106 ($AN_2$) may forward the "ready-to-send" message sent by the target to switch 106 ($AN_2$), e.g., to allow switch 105 to adjust buffer size estimates, but the switch 105 ($AN_1$) does not wait for this message before sending data towards the switch 106 ($AN_2$). Further, the switch 105 ($AN_1$) may use the status message from the target to clean up the I/O context created for the accelerated write operation once it is completed.

Further, services may be provided for traffic flowing between SAN 120 and SAN 125. For example, as the acceleration service (provided by switch 105 and 106) is offered independently from transport, the switch 107 and switch 104 (providing the link between SAN 120 and 125) may provide services such as compression, encryption, etc., along with the acceleration service.

At step 225, the second node in the acceleration service pair receives the message sent from the first node addressed as ($I_1$, $VT_2$). This is illustrated in FIG. 4A at "D," where the switch 106 ($AN_2$) receives a frame 420 having a source/destination pair of ($I_1$, $VT_2$). As noted, the switch 105 ($AN_1$) sends data to the switch 106 ($AN_2$) without waiting for a "ready-to-send" message. Once received, data switch 106 ($AN_2$) buffers data in an appropriate I/O context until a "ready-to send-" message is received from the target ($T_1$). In turn, switch 106 ($AN_2$), passes along the ready to send message to $AN_1$. Thus, switch 105 ($AN_1$) sends data immediately, while switch 106 $AN_2$ buffers data until a "ready-to-send" message is received from the target ($T_1$).

At step 230, the second node in the acceleration service pair initiates a write operation with the target ($T_1$) as a virtual initiator. That is, the second node in the acceleration service pair (switch 106) acts as a virtual target ($VT_2$) relative to the first node in the pair (switch 105) and acts as a virtual initiator ($VI_2$) relative to the actual target ($T_1$) of the write operation. The write operation may be released from the second node in the acceleration service pair to the SAN with a source/destination pair of ($VI_2$, $T_1$).

An FC-node in the second SAN then redirects the operation addressed as ($VI_2$, $T_1$) towards the target ($T_1$) as ($I_1$, $T_1$), based on entries in the FC-redirect table. This is illustrated in FIG. 4A at "E," and "F." Specifically, FIG. 4A illustrates a frame 425 sent from switch 106 ($AN_2$) into the SAN 125. As shown, the frame 425 has a source/destination pair of ($VI_2$, $T_1$). FIG. 4A also illustrates a frame 430 sent from switch 110 ($AN_2$) towards target ($T_1$). As shown, the frame 430 has a source/destination pair of ($I_1$, $T_1$). Thus, the frame 430 carrying the write operation request arrives at the target ($T_1$) having the original source/destination pair as sent from the data center 101, making the acceleration service fully transparent to the target ($T_1$).

At step 235, the target ($T_1$) receives the message sent from the second node addressed with a source/destination pair of ($I_1$, $T_1$), and the target ($T_1$) sends a "ready to send" message towards the original initiator ($I_1$). Once released to the SAN, an FC-node redirects the "ready to send" message to switch 106 ($AN_2$) (i.e., to the virtual initiator ($VI_2$)), based on entries in FC-redirect table.

At step 240, the second node in the acceleration service pair receives the redirected "ready to send" message sent from the target ($T_1$) and responds by sending the data buffered at step 225 to target ($T_1$). The data may be sent addressed as having a source/destination pair as ($VI_2$, $T_1$). An FC-node in the SAN then redirects the frame carrying the write operation data to target $T_1$ based on entries in NAT ACL list. For example, the FC-redirect table may include an entry redirecting a frame having a source/destination pair of ($VI_2$, $T_1$) to ($I_1$, $T_1$), resulting in the data being received by the target ($T_1$) as though being sent from the actual initiator ($I_1$).

Figure 4B:
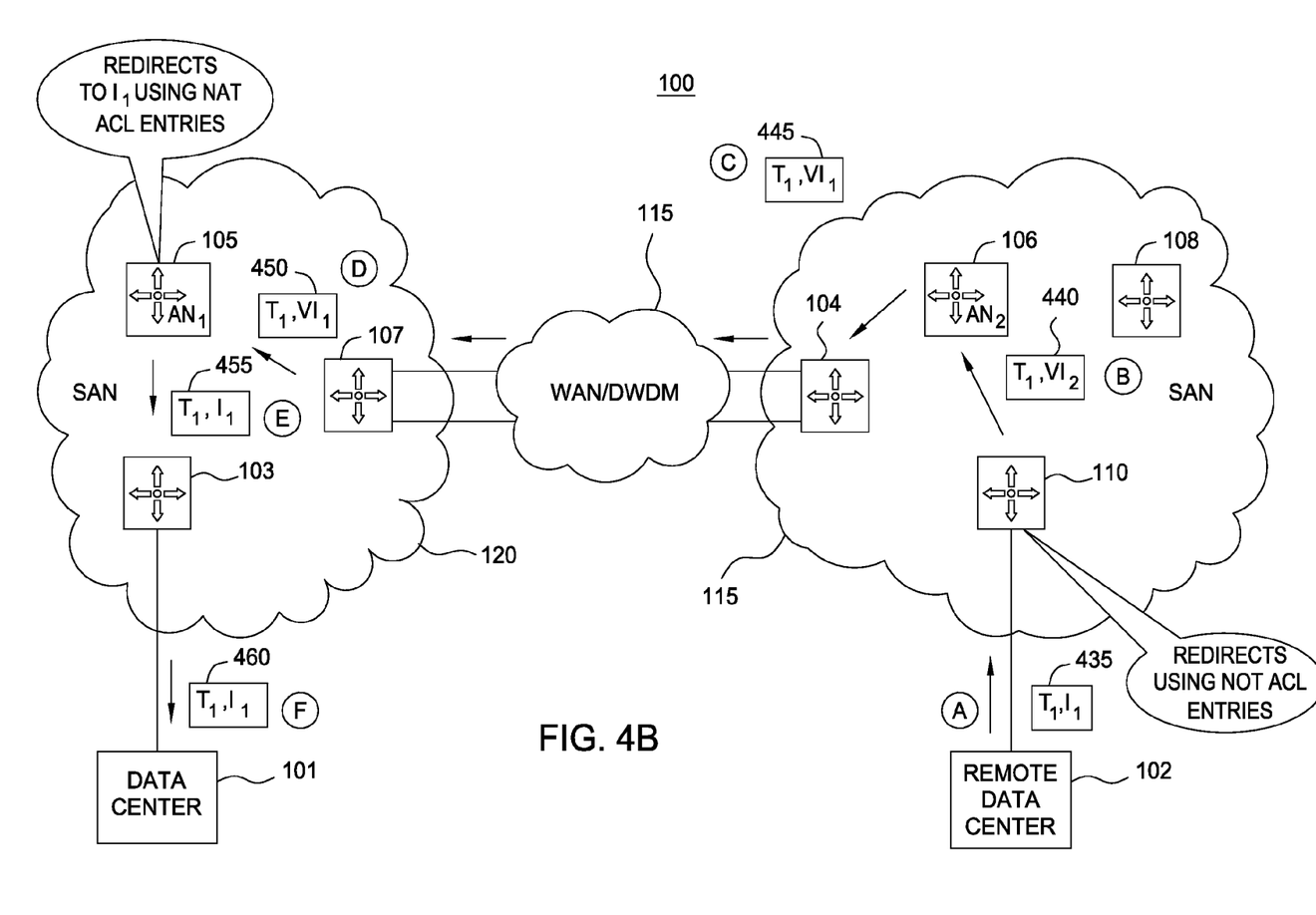

At step 245, the target ($T_1$) receives the data from switch 106 $AN_2$ (and originally from the initiator ($I_1$)) as ($I_1$, $T_1$), and performs the write operation. At step 250, once the write operation is completed, the target ($T_1$) sends a status message towards the initiator having as ($T_1$, $I_1$). The status message reflects the completed write operation. This is illustrated in FIG. 4B at "A" and "B." As shown, the target ($T_1$) at the remote data center 102 sends a frame 435 to the switch 110. Illustratively, the frame 435 includes a source/destination pair of ($T_1$, $I_1$) going into switch 110. Switch 110 redirects this frame using entries in the FC-redirect table towards the virtual initiator ($VI_2$). Thus, frame 440 is shown having a redirected source/destination pair of ($T_1$, $VI_2$).

At step 255, the second node in the acceleration node pair (switch 106 in this example) sends the status message towards the first node in the pair, which in turn sends it towards the original initiator ($I_1$). This is illustrated in FIG. 4B at "C," "D," "E," and "F." First, at "C," the switch 106 ($AN_2$) releases a frame 445 addressed as ($T_1$, $VI_1$), towards the target. The frame traverses the network 115 to switch 107. At "D," the switch 107 sends a frame 450 towards the destination address of ($VI_1$) (i.e., to switch 105). Once received, the switch 105 ($AN_1$) cleans up the I/O context for the accelerated write operation shown in this example.

As released, the frame 455 includes a source/destination pair of ($T_1$, $I_1$). In turn, switch 103 receives the frame and releases a frame 460 towards data center 101 with the same source/destination pair of ($T_1$, $I_1$). Thus, the frame 460 carrying the status message arrives at the initiator ($I_1$) in data center 101 having the original source/destination pair as sent from the target T at the remote data center 102, making the acceleration service fully transparent to the initiator ($I_1$).

FIGS. 4A-4B illustrate an embodiment which provides a single acceleration service pair using switch 105 (in SAN 120) and switch 106 (in SAN 125). Other embodiments allow users to create multiple acceleration node and/or acceleration node/pairs between two SANs connected over an FC/FCIP link. Doing so allows users to scale the acceleration service as needed, without having to create awkward topologies of multiple VSANS. In one embodiment, a user identifies a group of nodes/switches on each side of a WAN link capable of providing write operation (or tape acceleration) services. Thereafter, the user may configure the acceleration node pairs from the group of node on each side of the WAN link as follows:

classifies the fabric into two sites—one on each side of a WAN link.

selects a set of acceleration nodes on each site to form a node pairs.

configures the flows that traverses the sites for acceleration service.

orchestrates the distribution of FC Redirect entries appropriately throughout the fabric.

Figure 5:
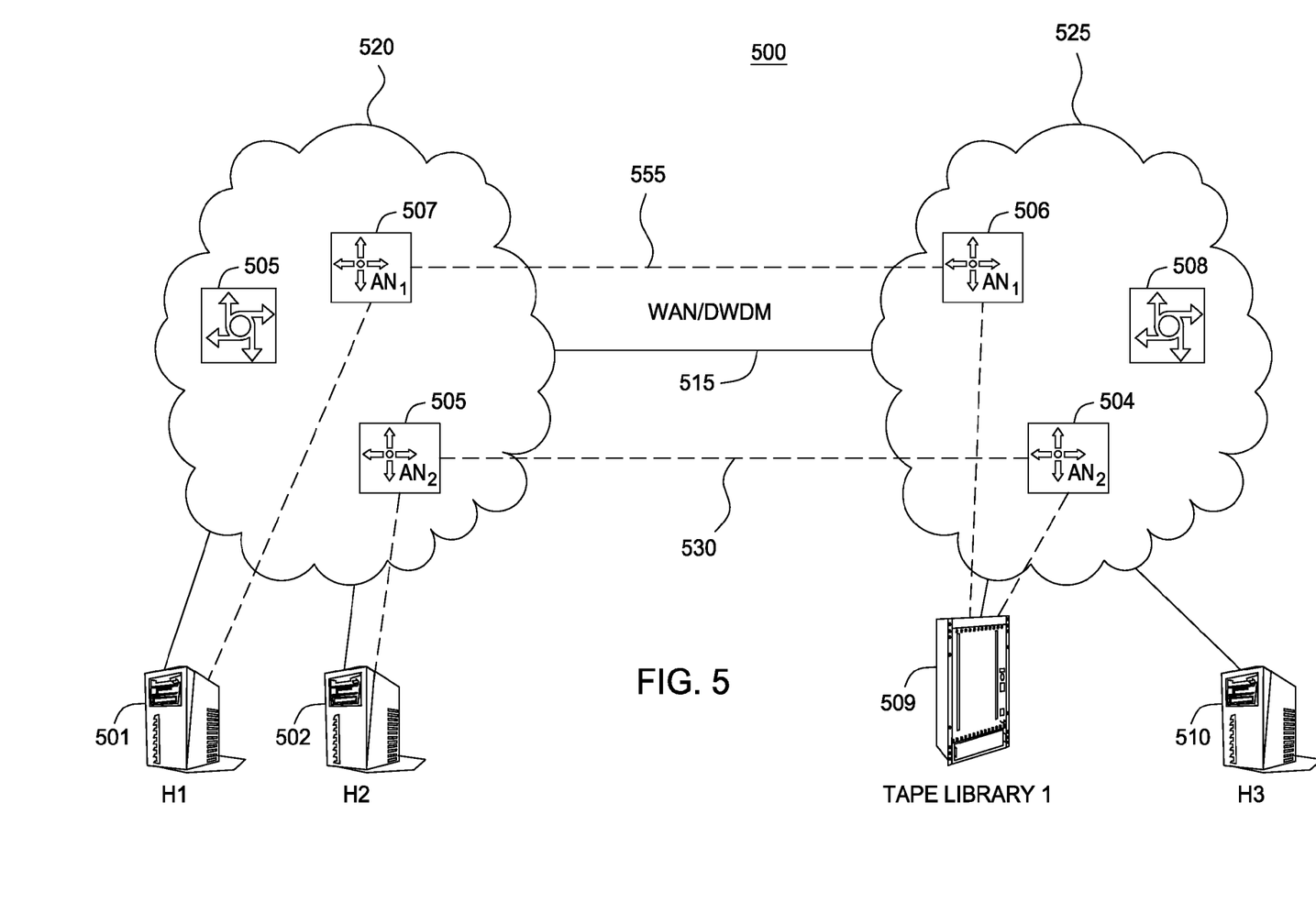
FIG. 5 illustrates a configuration model for providing multiple acceleration node pairs between a first and second SAN, according to one embodiment.

FIG. 5 illustrates a network topology 500 providing multiple acceleration node pairs between a first SAN 520 and second SAN 525, according to one embodiment. As shown, the first SAN 520 includes switches 503, 505, and 507. And the second SAN 525 includes switches 504, 506, and 508. Additionally, the SAN 520 and SAN 525 are connected over a link 515 (e.g., a WAN/DWDM link constructed using an FCIP/FC connection). In this example, the SAN 520 is connected to a first host 501 and a second host 502, and the SAN 525 is connected to a tape library 509 and a third host 510. Further, the network topology 500 includes two acceleration node pairs, a first pair 530 which includes switch 503 and switch 504, and a second pair 535 which includes switch 507 and switch 506. Accordingly, as the first host 510 initiates write operations (e.g., SCSI write operations to tape library 509), the traffic is redirected to the first acceleration node pair 530. At the same time, as the second host 502 initiates SCSI write operations to the tape library 509, the traffic is redirected to the second acceleration node pair 535. Thus, network topology 500 illustrates both load balancing and scalability of providing SCSI acceleration as a service in the SAN.

Advantageously, embodiments described in this disclosure abstract write acceleration techniques away from transport providers (e.g., away from an FC or FCIP interlink between two SANs) and allows acceleration to be provided as a service by nodes within the SAN. Doing so allows the acceleration service to be provided anywhere in the SAN. By abstracting the FC/FCIP write acceleration and tape acceleration techniques away from the transport itself (i.e., away from the FC or FCIP end points), the write acceleration service may be provided using a pair of service nodes, one in each site. Further, doing so allows users to scale the acceleration service as needed, without having to create awkward topologies of multiple VSANS. Further still, as the acceleration service is offered independently from the transport, compression, encryption, and other services may be offered as part of the transport between the FC/FCIP connection along with the acceleration service.

While the foregoing is directed to embodiments of the present disclosure, other and further embodiments of the disclosure may be devised without departing from the basic scope thereof, and the scope thereof is determined by the claims that follow.

The invention claimed is:

1. A first routing device in a first storage area network (SAN), comprising:
   a processor; and
   a memory, wherein the memory includes a program configured to perform an operation for providing an acceleration service for a write operation initiated between an initiating device attached to the first SAN and a target device attached to a second SAN, and wherein the first SAN and the second SAN are connected via a network link, the operation comprising:
      receiving a write operation sent from the initiating device attached to the first SAN, wherein the write operation has been redirected to a first routing device based on an entry in a redirect table shared among a plurality of routing devices in the first SAN, wherein the redirect table provides a network address translation (NAT) access control list (ACL), wherein the NAT ACL specifies a plurality of source/destination address pairs to redirect frames routed by the routing devices of the first SAN to a respective redirected source/destination address pair, and
      performing the acceleration service to transfer data between the initiating device and the target device in order to complete the write operation, wherein the acceleration service is performed in conjunction with a second routing device on the second SAN.

2. The routing device of claim 1, wherein the acceleration service is a SCSI acceleration service and the write operation is a SCSI write operation.

3. The routing device of claim 1, wherein the first SAN and the second SAN are connected over an Inter-virtual SAN routing (IVR) connection.

4. The routing device of claim 1, wherein the acceleration service is a tape acceleration service and the target device is a tape library.

5. The routing device of claim 1, wherein the network link is one of a Fibre Channel connection between the first SAN and the second SAN and a Fibre Channel over IP connection between the first SAN and the second SAN.

6. The routing device of claim 1, wherein frames transmitted over the network link from the first SAN to the second SAN are compressed using a compression service provided by a routing device connecting the first SAN to the network link.

7. The routing device of claim 1, wherein the target device receives the write operation addressed as having been sent from the initiating device, making the acceleration service transparent to the target device.

8. A computer-readable storage medium, containing a program, which, when executed on a first routing device in a storage area network (SAN) performs an operation, comprising:
   receiving a write operation sent from an initiating device attached to the first SAN to a target device attached to a second SAN, wherein the write operation has been redirected to the first routing device based on an entry in a redirect table shared among a plurality of routing devices in the first SAN, wherein the redirect table provides a network address translation (NAT) access control list (ACL), wherein the NAT ACL specifies a plurality of source/destination address pairs to redirect frames routed by the routing devices of the first SAN to a respective redirected source/destination address pair, and wherein the first SAN and the second SAN are connected via a network link; and
   performing an acceleration service to transfer data between the initiating device and the target device in order to complete the write operation, wherein the acceleration service is performed by the first routing device in conjunction with the second routing device on the second SAN.

9. The computer-readable storage medium of claim 8, wherein the acceleration service is a SCSI acceleration service and the write operation is a SCSI write operation.

10. The computer-readable storage medium of claim 8, wherein the acceleration service is a tape acceleration service and the target device is a tape library.

11. The computer-readable storage medium of claim 8, wherein frames transmitted over the network link from the first SAN to the second SAN are compressed using a compression service provided by a routing device connecting the first SAN to the network link.

12. The computer-readable storage medium of claim 8, wherein the target device receives the write operation addressed as having been sent from the initiating device, making the acceleration service transparent to the target device.

13. A method, comprising:

receiving, at a first routing device in a storage area network (SAN), a write operation sent from an initiating device attached to the first SAN to a target device attached to a second SAN, wherein the write operation has been redirected to the first routing device based on an entry in a redirect table shared among a plurality of routing devices in the first SAN, wherein the redirect table provides a network address translation (NAT) access control list (ACL), wherein the NAT ACL specifies a plurality of source/destination address pairs to redirect frames routed by the routing devices of the first SAN to a respective redirected source/destination address pair, and wherein the first SAN and the second SAN are connected via a network link; and performing an acceleration service to transfer data between the initiating device and the target device in order to complete the write operation, wherein the acceleration service is performed by the first routing device in conjunction with the second routing device on the second SAN.

14. The method of claim 13, wherein the acceleration service is a SCSI acceleration service and the write operation is a SCSI write operation.

15. The method of claim 13, wherein the acceleration service is a tape acceleration service and the target device is a tape library.

16. The method of claim 13, wherein frames transmitted over the network link from the first SAN to the second SAN are compressed using a compression service provided by a routing device connecting the first SAN to the network link.

17. The method of claim 13, wherein the target device receives the write operation addressed as having been sent from the initiating device, making the acceleration service transparent to the target device.

* * * * *

UNITED STATES PATENT AND TRADEMARK OFFICE
CERTIFICATE OF CORRECTION

PATENT NO.        : 8,051,203 B2
APPLICATION NO.   : 12/474966
DATED             : November 1, 2011
INVENTOR(S)       : Basavaiah et al.

Page 1 of 1

It is certified that error appears in the above-identified patent and that said Letters Patent is hereby corrected as shown below:

Column 4, Line 61, please delete "identity" and insert --identify-- therefor.

Signed and Sealed this
Fourteenth Day of February, 2012

David J. Kappos
*Director of the United States Patent and Trademark Office*